(12) United States Patent
Ubowski et al.

(10) Patent No.: US 6,346,692 B1
(45) Date of Patent: *Feb. 12, 2002

(54) ADAPTIVE MICROWAVE OVEN

(75) Inventors: Richard M. Ubowski, Harleysville; John P. Veschi, Fogelsville, both of PA (US)

(73) Assignee: Agere Systems Guardian Corp., Orlando, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/399,147

(22) Filed: Sep. 20, 1999

(51) Int. Cl.[7] ................................................ H05B 6/68
(52) U.S. Cl. ........................ 219/702; 455/63; 455/66; 340/825.71
(58) Field of Search ............................... 219/702, 714, 219/736–737; 340/536, 825.71–825.76; 455/63, 66, 151.1, 92, 69, 70, 556–557; 307/117

(56) References Cited

U.S. PATENT DOCUMENTS

| 3,679,908 A | * 7/1972 | Mazza | 307/117 |
|---|---|---|---|
| 3,746,824 A | * 7/1973 | Prucha | 219/737 |
| 3,753,003 A | * 8/1973 | Mazza | 307/117 |
| 4,131,786 A | * 12/1978 | Cooper | 219/487 |
| 4,296,296 A | 10/1981 | Eichelberger | |
| 4,335,468 A | * 6/1982 | Foster et al. | 455/501 |
| 4,415,789 A | 11/1983 | Nobue | |
| 4,816,635 A | * 3/1989 | Edamura | 219/714 |
| 4,837,414 A | * 6/1989 | Edamula | 219/714 |
| 5,120,916 A | 6/1992 | Horinouchi | |
| 5,710,409 A | * 1/1998 | Schwarzbacker et al. | 219/506 |
| 5,875,430 A | * 2/1999 | Koether | 705/1 |
| 5,883,367 A | 3/1999 | Cho | |
| 6,006,071 A | * 12/1999 | Roberts et al. | 455/63 |

FOREIGN PATENT DOCUMENTS

| EP | 965795 | * 12/1999 | |
|---|---|---|---|
| JP | 59-176655 | * 10/1984 | |
| JP | 61-76825 | * 4/1986 | |
| JP | 2-183992 | * 7/1990 | |
| JP | 3-156882 | * 7/1991 | |
| JP | 10-276478 | * 10/1998 | |

* cited by examiner

Primary Examiner—John A. Jeffery
(74) Attorney, Agent, or Firm—William H. Bollman

(57) ABSTRACT

The present invention provides an adaptive microwave oven capable of entering an operation mode which avoids interference with a communication device either upon detection of a communication from a communication device (e.g., a cordless telephone) operating in a microwave frequency range, or upon receipt of a command indicating the operation of a microwave device such as a cordless telephone through a suitable network (e.g., a piconet using BLUETOOTH Technology). In one embodiment, a cooking mode of a microwave oven is paused (or significantly reduced) to best avoid interference with microwave signals between a remote handset and a matching base unit of a cordless telephone. The activity of microwave communications within the vicinity of the adaptive microwave oven can be determined, e.g., using a passive cordless telephone receiver which detects communication activity in the microwave range, or using direct communications from the cordless telephone using a suitable wireless network, e.g., a piconet using BLUETOOTH technology. In another embodiment, the frequency of an adaptive microwave oven capable of generating microwave energy at any of a plurality of microwave frequency ranges is controlled in accordance with the microwave frequency used by an electronic device (e.g., a cordless telephone) in the vicinity of the adaptive microwave oven. In this embodiment, a cordless telephone receiver can provide a controller for the adaptive microwave oven with passively detected information regarding the frequency of communication traffic in the vicinity of the microwave oven, or a wireless network can be used to provide frequency information directly between the relevant electronic device (e.g., cordless telephone) and the adaptive microwave oven.

40 Claims, 5 Drawing Sheets

ADAPTIVE MICROWAVE OVEN

BACKGROUND OF THE INVENTION

1. Field of the Invention

This invention relates generally to microwave ovens. More particularly, it relates to a microwave oven which adaptively avoids interference with a communication device (e.g., a cordless telephone) operating in the microwave frequency range.

2. Background of Related Art

Microwave ovens, familiar to most people, are commonplace in homes and office kitchens. A microwave oven provides a user with the convenience of quick and efficient cooking.

In a typical microwave oven, microwave energy is generated in a special electron tube, such as a klystron or a magnetron, with built-in resonators to control the frequency at a pre-determined frequency. Alternatively, microwave energy for cooking purposes can be generated using special oscillators or solid-state devices. The microwaves generated in a conventional microwave oven are short, high-frequency radio waves (i.e., ultra high frequency (UHF) radio waves) lying roughly between very-high-frequency waves and conventional radio waves (i.e., between 300 megahertz (MHz) and 3 gigahertz (GHz)).

Microwave ovens operate by agitating water molecules in food with the microwave energy, causing the water molecules to vibrate, producing heat. In a typical microwave oven, microwave energy enters through openings in the top of a cooking cavity, and a stirrer scatters the microwave energy evenly throughout the oven.

While useful for cooking, microwave energy has many other types of applications. For instance, besides microwave ovens, microwave energy is used for broadcast radio and television, radar, meteorology, satellite communications, distance measuring, UHF CB Radio, and Mobile Phones, to name a few.

Exposure to microwaves can be dangerous, particularly where high densities of microwave radiation are involved. Microwaves can cause burns, cataracts, damage to the nervous system, and sterility. The possible danger of long-term exposure to low-level microwaves is not yet well known. Nevertheless, the U.S. government generally limits the exposure level to microwave energy to 10 milliwatts per square centimeter, with stricter limits typically placed on microwave ovens. Nevertheless, in microwave ovens, some amount of microwave energy is allowed to, and does, escape through the shielding surrounding the cooking cavity, particularly through the screening in the door allowing visual observation of the food being cooked. This escaping microwave energy can and does cause interference with nearby electronic devices, e.g., a cordless telephone utilizing the same or similar frequency band for the transmission of communication information.

FIG. 5 depicts the operation of a microwave oven 302 in the vicinity of an electronic device, e.g., a cordless telephone system affected by the leakage of microwave energy.

In particular, as shown in FIG. 5, a remote handset 304 of a cordless telephone system and/or its base unit 306 is operated in the vicinity of a conventional microwave oven 302, which leaks some amount of microwave energy. In the given example, the cordless telephone system utilizes a microwave frequency band for communication purposes between the remote handset 304 and its base unit 306. As a result, operation of the cordless telephone 304, 306 can suffer during operation of the microwave oven 302. This is particularly true if the remote handset 304 and/or base unit 306 of the cordless telephone is placed within close proximity of the microwave oven 302 while it is operating, and/or if the wireless communication path between the remote handset 304 and its base unit 306 crosses in a vicinity of the microwave oven 302.

In many instances, the user of the cordless telephone either may not detect the interference caused by the microwave oven (e.g., with error correction compensating for a low level of interference), or may not appreciate the operation of the microwave oven as the cause of a disruption in service between the remote handset 304 and its base unit 306.

Thus, there is a need for a microwave oven which better avoids interference with communication devices (e.g., a cordless telephone) within the vicinity of the microwave oven.

SUMMARY OF THE INVENTION

In accordance with the principles of the present invention, an adaptive microwave oven controller includes a processor, and a communication receiver to detect a presence of communication activity in a microwave frequency range in a vicinity of the adaptive microwave oven.

In accordance with another aspect of the present invention, an adaptive microwave oven controller includes a processor, and a communication receiver to detect a frequency of communication activity in a microwave frequency range in a vicinity of the adaptive microwave oven. A frequency of microwaves generated by an adaptive microwave oven controlled by the adaptive microwave oven controller is based on the frequency of the communication activity.

A method of adaptively controlling a microwave oven to avoid interference with microwave communication signals in a vicinity of the microwave oven in accordance with yet another aspect of the present invention comprises communicating information regarding a frequency of a carrier of transmitted communication signals from a cordless telephone to a microwave oven. An operating mode of the microwave oven is controlled based on the communicated information.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides an adaptive microwave oven capable of changing a mode of operation in coordination with a nearby electronic device, e.g., a cordless telephone. In accordance with the principles of the present invention, the adaptive microwave oven may change its mode of operation based on the passive detection of wireless communication traffic activity in a frequency range which would be affected by the leakage from the adaptive microwave oven.

Moreover, or alternatively, a more sophisticated technique can be employed wherein an electronic device such as a cordless telephone can communicate directly with an adaptive microwave oven in accordance with the principles of the present invention using a suitable wireless network (e.g., a piconet network utilizing BLUETOOTH technology). Using the wireless network, operation of the adaptive microwave oven is coordinated with the operation of a device such as a cordless telephone, e.g., so that the frequency of operation of the adaptive microwave oven differs substantially from that being employed by the cordless telephone. Using this more sophisticated technique, the adaptive microwave oven and the cordless telephone can frequency hop in coordination with one another in a manner which avoids interference between the two.

Figure 1:
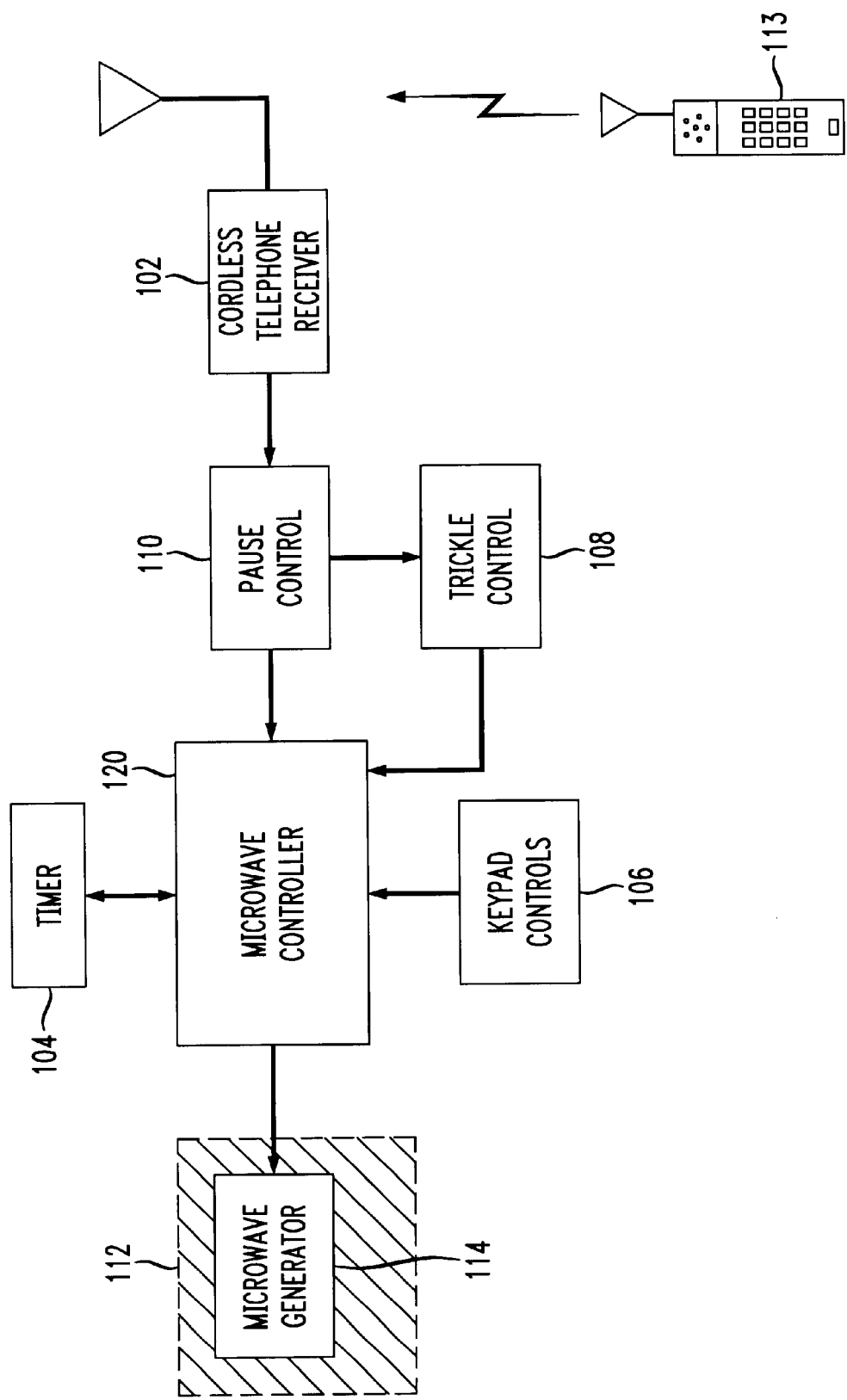
FIG. 1 shows a block diagram of a first embodiment of an adaptive microwave oven capable of pausing and/or trickle cooking a cooking cycle in progress upon detection of a communication transmission utilizing microwave energy, in accordance with the principles of the present invention.

FIG. 1 shows a block diagram of a first embodiment of an adaptive microwave oven capable of pausing and/or trickle cooking a cooking cycle in progress upon detection of a communication transmission utilizing microwave energy, in accordance with the principles of the present invention.

In particular, in FIG. 1, the adaptive microwave oven includes a microwave generator (e.g., a magnetron) 114 within a shielded enclosure 112. The microwave generator 114 is controlled by a suitable microwave controller 120 (e.g., a microcontroller, a microprocessor, or digital signal processor). As in conventional microwave ovens, the adaptive microwave oven includes keypad controls 106 allowing a user to select modes of operation and lengths of operation, and a timer 104 to time the selected cooking mode of operation.

In accordance with the principles of the first embodiment of the present invention, a pause control module 110 provides pause information to the microwave controller 120 requesting a change in a cooking mode (e.g., a pause in cooking) based on operation of an electronic device in the vicinity of the adaptive microwave oven.

In the embodiment shown in FIG. 1, information regarding operation of an electronic device (e.g., a cordless telephone) is provided to the pause control module 110 by a cordless telephone receiver unit 102 and suitable antenna. Communication traffic in the microwave range may be output by a cordless telephone remote handset 113 operating in the microwave range.

In operation, when communication traffic of any protocol is detected in the vicinity of the adaptive microwave oven by the cordless telephone receiver 102, the pause control module 110 initiates a change in a cooking mode of the adaptive microwave oven (e.g., pauses cooking, or prevents new cooking modes) until a suitable time after the communication traffic is no longer detected.

In the embodiment of FIG. 1, the cooking mode of the adaptive microwave oven can be paused using the pause control module 110. However, to prevent degradation in the overall cooking of the food being cooked, it may be desirable to maintain the present level of heat in the food by occasionally generating a lower power level of microwaves from the microwave generator 114. If this is desirable, a trickle control module 108 provides the cooking mode information relevant to maintaining a current condition of the cooked food during a pause period.

Figure 2:
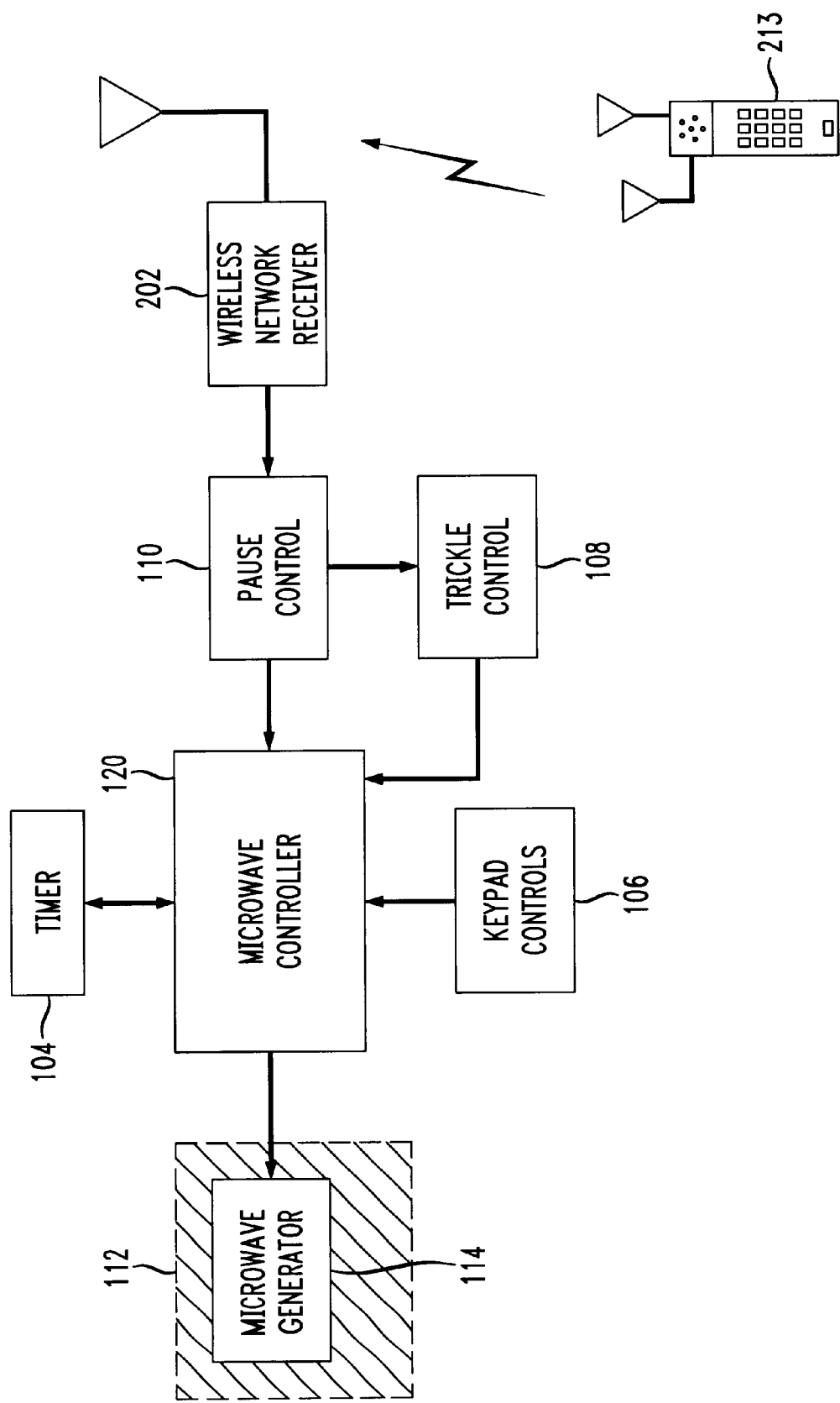
FIG. 2 shows a block diagram of another embodiment of an adaptive microwave oven capable of pausing and/or trickle cooking a cooking cycle in progress upon receipt of a command via a wireless network indicating the desirability of a communication transmission utilizing microwave energy, in accordance with the principles of the present invention.

FIG. 2 shows a block diagram of another embodiment of an adaptive microwave oven capable of pausing and/or trickle cooking a cooking cycle in progress upon receipt of a command via a wireless network indicating the desirability of a communication transmission utilizing microwave energy, in accordance with the principles of the present invention.

In particular, in FIG. 2, the microwave controller 120, keypad controls 106, timer 104, and microwave generator 114 are otherwise as shown in FIG. 1. Moreover, the pause control module 110 and trickle control module 108 are otherwise as described with respect to FIG. 1. However, in accordance with the embodiment shown in FIG. 2, information regarding activity of relevant electronic devices in the vicinity of the adaptive microwave oven (e.g., cordless telephones) is specifically communicated by the electronic device (e.g., a cordless telephone remote handset 213) to the adaptive microwave oven using a suitable wireless network. To this extent, the embodiment shown in FIG. 2 includes a wireless network receiver 202 in place of the cordless telephone receiver 102 shown in FIG. 1.

The wireless network utilized for communications between the cordless telephone component (e.g., base unit or remote handset) and the adaptive microwave oven may use the same or a different antenna otherwise used for microwave communications. For instance, BLUETOOTH network technology may be used to implement the wireless network.

The BLUETOOTH network technology is an open specification for wireless communication of data and voice and is based on a low-cost, short-range radio link. If using the BLUETOOTH network technology, the remote handset 213 of the cordless telephone (or the base unit) as well as the adaptive microwave oven become members of a piconet wireless network. A piconet is a collection of devices connected via BLUETOOTH network technology. The piconet may also include non-microwave related processors, e.g., the user's home computer.

Figure 3:
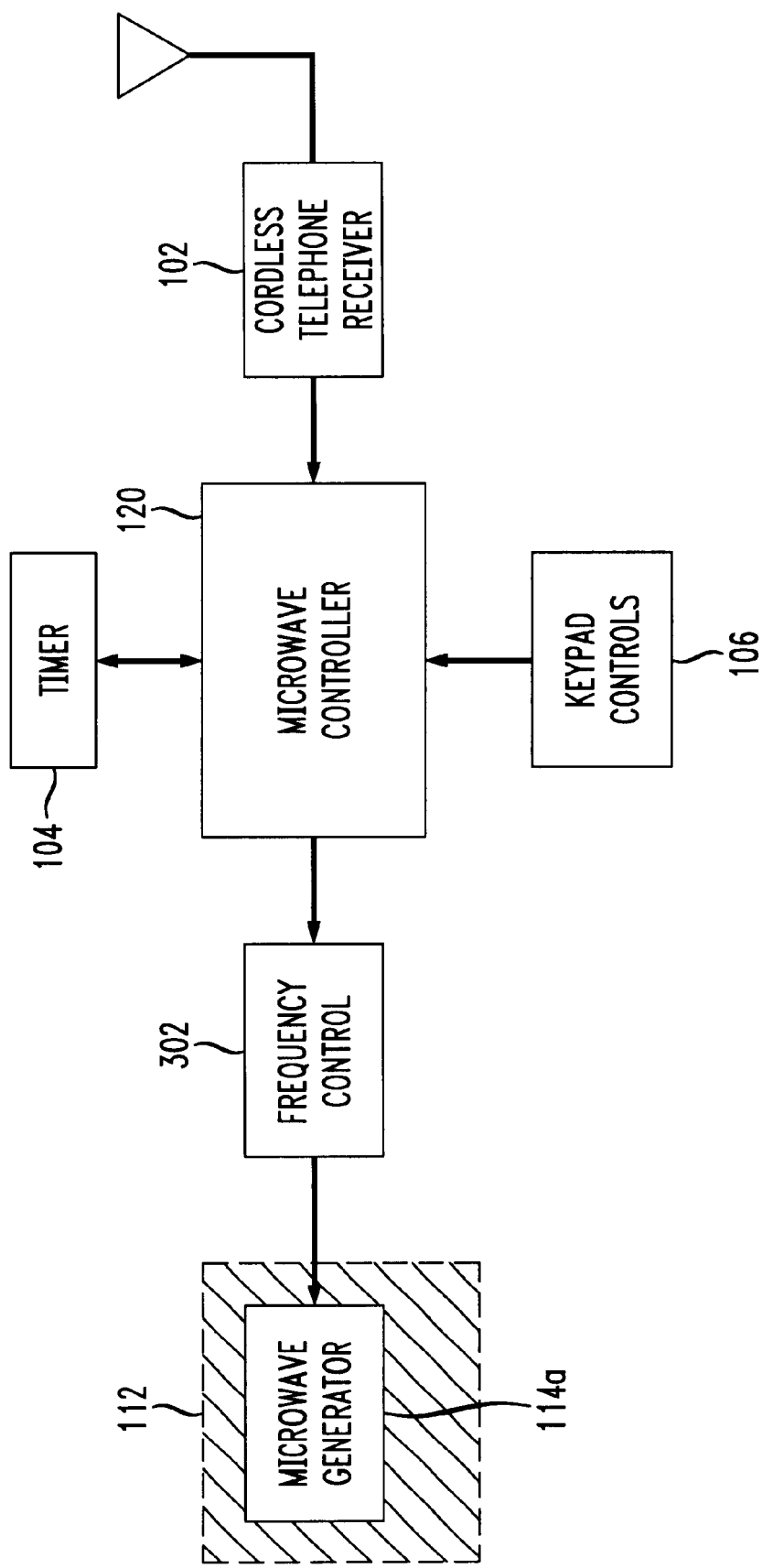
FIG. 3 shows a block diagram of yet another embodiment of an adaptive microwave oven capable of frequency hopping away from a microwave frequency otherwise desired for use by a priority communication device (e.g., a cordless telephone) detected in operation, in accordance with the principles of the present invention.

FIG. 3 shows a block diagram of yet another embodiment of an adaptive microwave oven capable of frequency hopping away from a microwave frequency otherwise desired for use by a priority communication device (e.g., a cordless telephone) detected in operation, in accordance with the principles of the present invention.

In particular, in FIG. 3, the frequency of a microwave generator 114a capable of outputting microwave energy in any of a plurality of frequency ranges is controlled by a frequency control module 302. The frequency control module 302 instructs the microwave generator as to a microwave frequency range which is to be generated in accordance with a current cooking mode operation. Thus, in accordance with the principles of the present invention, the frequency of the microwave energy can be controlled to avoid interference with a particular frequency used by a relevant microwave electronic device, e.g., a microwave cordless telephone.

Information regarding current communication traffic in the vicinity of the adaptive microwave oven can be detected using a cordless telephone receiver 102 as shown and described with respect to FIG. 1, and provided directly to the microwave controller 120. FIG. 3 otherwise includes the microwave controller 120, the timer 104, the keypad controls 106 as shown and described with respect to FIG. 1.

Figure 4:
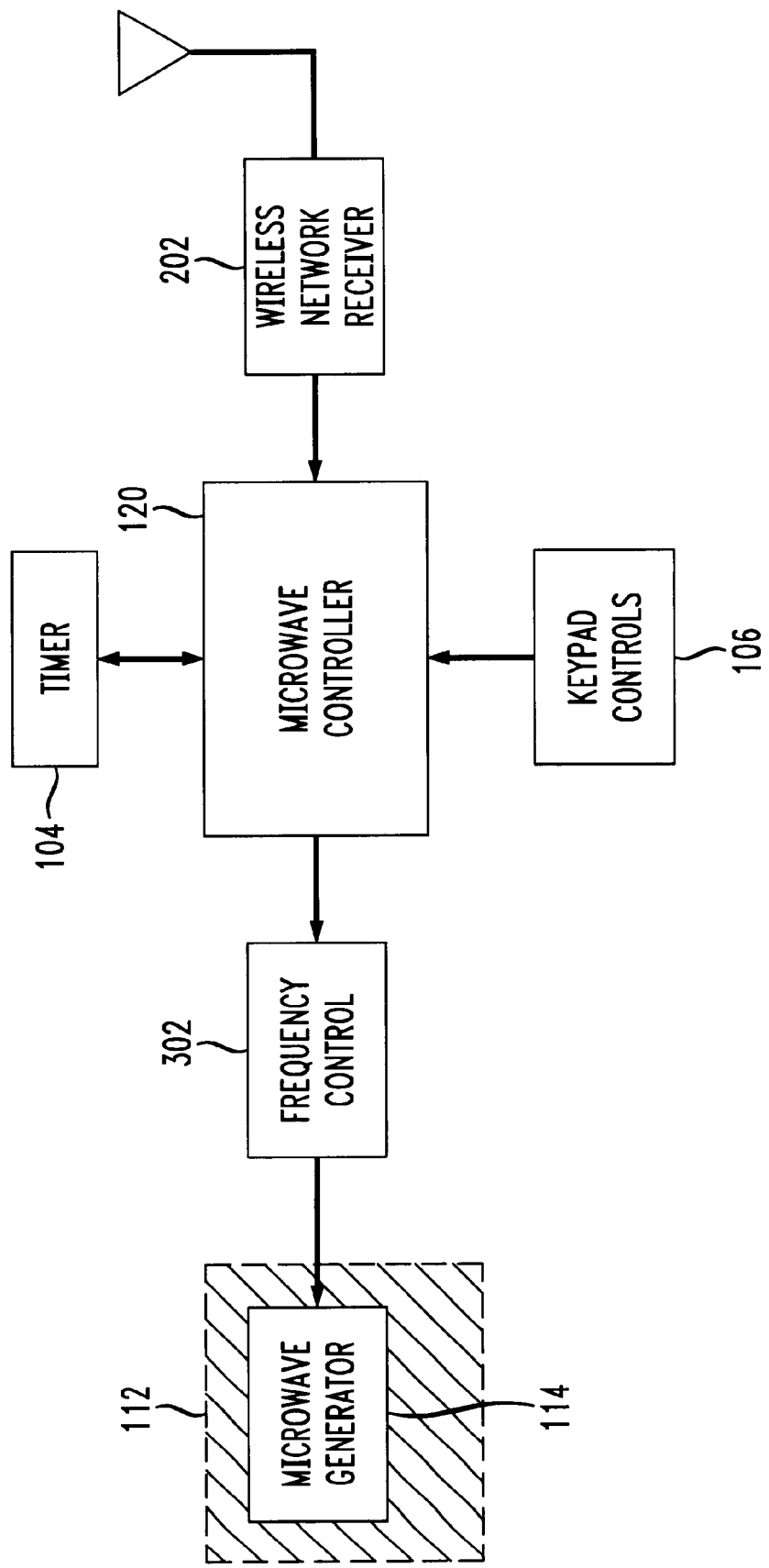
FIG. 4 shows a block diagram of still another embodiment of an adaptive microwave oven capable of frequency hopping away from a microwave frequency otherwise desired for use and/or in coordination with a priority communication device (e.g., a cordless telephone) upon receipt of a relevant command via a wireless network, in accordance with the principles of the present invention.
Figure 5:
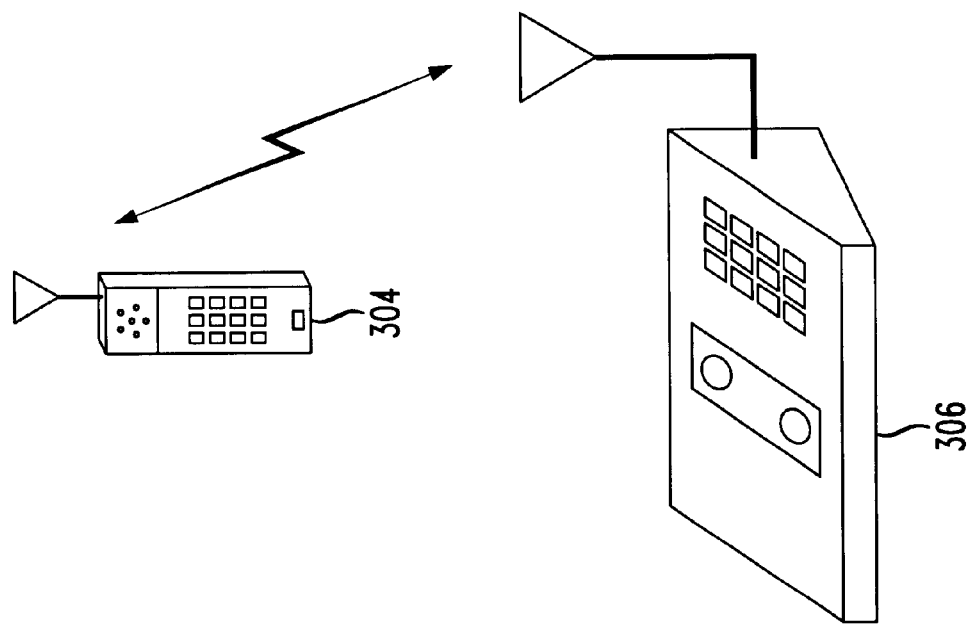
FIG. 5 depicts the leakage of microwave energy from a conventional microwave oven and its affect on nearby communication systems (e.g., a cordless telephone) utilizing microwave frequency bands.
Figure 5:
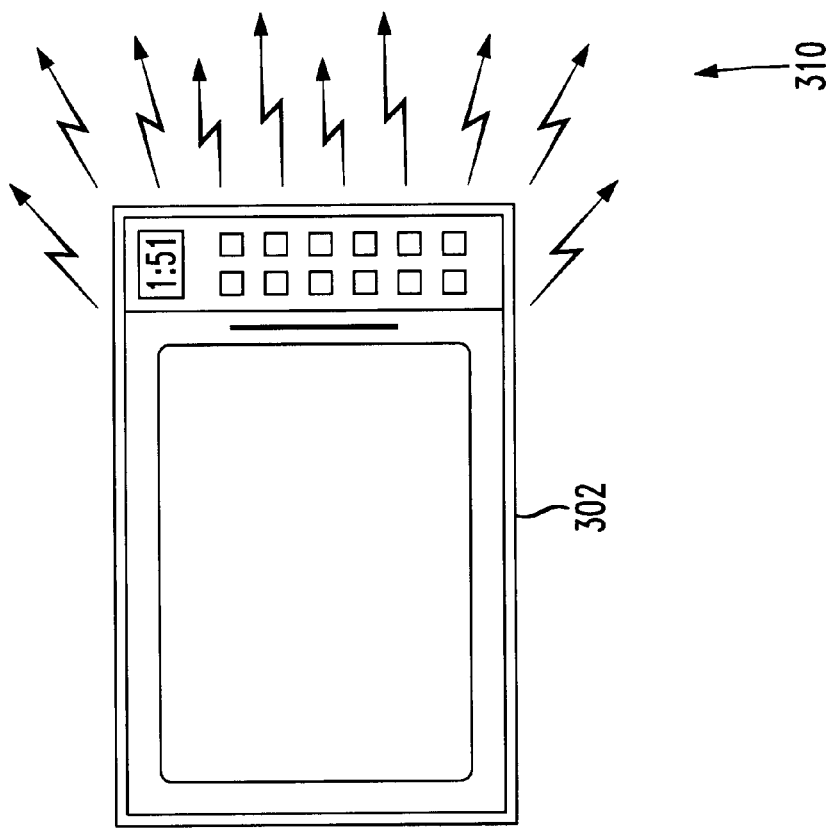

FIG. 4 shows a block diagram of still another embodiment of an adaptive microwave oven capable of frequency hopping away from a microwave frequency otherwise desired for use and/or in coordination with a priority communication device (e.g., a cordless telephone) upon receipt of a relevant command via a wireless network, in accordance with the principles of the present invention.

In particular, FIG. 4 shows that frequency control information can alternatively be provided by a suitable wireless network using an appropriate wireless network receiver 202, as otherwise shown and described with respect to FIG. 2.

In the embodiment of FIG. 4, frequency hopping can be performed not only by the cordless telephone but also by the adaptive microwave oven. For instance, given information regarding a frequency hopping sequence by a cordless telephone in the vicinity of the adaptive microwave oven via the wireless network, the frequency control module 302 of the adaptive microwave oven can hop in coordination with the frequency hopping of the cordless telephone so as to best avoid interference between microwave energy escaping from the adaptive microwave oven and microwave frequency communication signals being transmitted by the base unit and/or remote handset of a nearby cordless telephone.

While the invention has been described with reference to the exemplary embodiments thereof, those skilled in the art will be able to make various modifications to the described embodiments of the invention without departing from the true spirit and scope of the invention.

What is claimed is:

1. An adaptive microwave oven controller comprising:
   a processor; and
   a communication receiver to detect a presence of communication activity from a source external to an adaptive microwave oven in a microwave frequency range in a vicinity of said adaptive microwave oven;
   wherein said communication activity is unrelated to purposeful control of said adaptive microwave oven.

2. The adaptive microwave oven controller according to claim 1, further comprising:
   a pause control module in communication with said processor and said communication receiver, said pause control providing a pause signal to said processor based on receipt of a detected presence of said communication activity.

3. The adaptive microwave oven controller according to claim 2, wherein said pause control module includes:
   a trickle control module capable of preventing degradation of an existing cooking cycle of an adaptive microwave oven.

4. The adaptive microwave oven controller according to claim 1, further comprising:
   a microwave generator in communication with said processor.

5. The adaptive microwave oven controller according to claim 1, wherein:
   said external source is a cordless telephone.

6. The adaptive microwave oven controller according to claim 1, wherein:
   said external source is a wireless network.

7. The adaptive microwave oven controller according to claim 6, wherein:
   said wireless network is a member of a piconet.

8. The adaptive microwave oven controller according to claim 1, wherein:
   said communication receiver further detects a characteristic of said present communication activity; and
   said adaptive microwave oven is controlled based on said detected characteristic of, as opposed to information contained in, said communication activity.

9. An adaptive microwave oven controller including:
   a processor; and
   a communication receiver to detect a frequency of communication activity in a microwave frequency range in a vicinity of said adaptive microwave oven;
   wherein a frequency of microwaves generated by an adaptive microwave oven controlled by said adaptive microwave oven controller is based on said frequency of said communication activity.

10. The adaptive microwave oven controller according to claim 8, further comprising:
    a microwave generator in communication with said processor.

11. The adaptive microwave oven controller according to claim 8, wherein:
    said communication receiver is a cordless telephone receiver.

12. The adaptive microwave oven controller according to claim 9, wherein:
    said communication receiver is a wireless network receiver.

13. The adaptive microwave oven controller according to claim 12, wherein:
    said wireless network is a member of a piconet.

14. A method of adaptively controlling a microwave oven to avoid interference with communication signals in a vicinity of said microwave oven, comprising:
    communicating information regarding a presence of unrelated radio signals in a vicinity of said microwave oven, to a microwave oven; and
    controlling an operation of said microwave oven based on said unrelated radio signals;
    wherein said unrelated radio signals are unrelated to purposeful control of said microwave oven.

15. A method of adaptively controlling a microwave oven to avoid interference with communication signals in a vicinity of said microwave oven, comprising:
    communicating information regarding a frequency of operation of a cordless telephone to a microwave oven; and
    controlling an operation of said microwave oven based on said communicated information which is unrelated to purposeful control of said microwave oven.

16. A method of adaptively controlling a microwave oven to avoid interference with communication signals in a vicinity of said microwave oven, comprising:
    communicating information regarding communication signals unrelated to purposeful control of a microwave oven, to said microwave oven; and controlling an operation of said microwave oven based on said communicated information;

said information being communicated using a wireless network.

17. The method of adaptively controlling a microwave oven to avoid interference with microwave communication signals in a vicinity of said microwave oven according to claim 16, wherein:

said wireless network is a piconet.

18. Apparatus for adaptively controlling a microwave oven to avoid interference with microwave communication signals in a vicinity of said microwave oven according to claim 17, comprising:

means for communicating information regarding microwave communication signals to a microwave oven; and means for controlling an operating mode of said microwave oven based on said communicated information.

19. The apparatus for adaptively controlling a microwave oven to avoid interference with microwave communication signals in a vicinity of said microwave oven according to claim wherein:

said means for communicating information provides information regarding a frequency of operation of a cordless telephone.

20. The apparatus for adaptively controlling a microwave oven to avoid interference with microwave communication signals in a vicinity of said microwave oven according to claim 18, wherein:

said means for communicating information includes a wireless network receiver.

21. The apparatus for adaptively controlling a microwave oven to avoid interference with microwave communication signals in a vicinity of said microwave oven according to claim 20, wherein:

said wireless network is a piconet.

22. Apparatus for adaptively controlling a microwave oven to avoid interference with communication signals in a vicinity of said microwave oven, comprising:

means for communicating information regarding unrelated radio signals in a vicinity of said microwave oven, to said microwave oven; and means for controlling an operation of said microwave oven based on said communicated information;

wherein said unrelated radio signals are unrelated to purposeful control of said microwave oven.

23. An apparatus for adaptively controlling a microwave oven, comprising:

means for communicating information regarding communication signals to a microwave oven; and means for controlling an operation of said microwave oven based on said communicated information which is unrelated to purposeful control of said microwave oven;

said means for communicating information providing information regarding a frequency of operation of a cordless telephone.

24. An apparatus for adaptively controlling a microwave oven, comprising:

means for communicating information regarding communication signals to a microwave oven; and means for controlling an operation of said microwave oven based on said communicated information which is unrelated to purposeful control of said microwave oven;

said means for communicating information including a wireless network transceiver.

25. The apparatus for adaptively controlling a microwave oven according to claim 24, wherein:

said wireless network is a piconet.

26. An adaptive microwave oven comprising:

a processor; and a cordless telephone receiver to detect a presence of RF communication activity in a vicinity of said adaptive microwave oven, said detected RF communication activity being unrelated to purposeful control of said adaptive microwave oven.

27. An adaptive microwave oven comprising:

a processor; and a wireless network receiver to detect a presence of RF communication activity in a vicinity of said adaptive microwave oven, said detected RF communication activity being unrelated to purposeful control of said adaptive microwave oven.

28. An adaptive microwave oven controller, comprising:

a processor; and a communication receiver to detect a presence of unrelated radio signal activity from a source external to said adaptive microwave oven;

wherein said unrelated radio signal activity is unrelated to purposeful control of said adaptive microwave oven.

29. The adaptive microwave oven controller according to claim 28, further comprising:

a pause control module in communication with said processor and said communication receiver, said pause control providing a pause signal to said processor based on receipt of a detected presence of said communication activity.

30. An adaptive microwave oven controller, comprising:

a processor; and a cordless telephone receiver to detect a presence of communication activity from a source external to said adaptive microwave oven, said detected communication activity being unrelated to purposeful control of said adaptive microwave oven.

31. An adaptive microwave oven controller, comprising:

a processor;

a communication receiver to detect a presence of communication activity from a source external to said adaptive microwave oven; and a pause control module in communication with said processor and said communication receiver, said pause control providing a pause signal to said processor based on receipt of a detected presence of said communication activity, said pause control module including:

a trickle control module capable of preventing degradation of an existing cooking cycle of an adaptive microwave oven.

32. An adaptive microwave oven controller, comprising:

a processor; and a wireless network to detect a presence of communication activity from a source external to said adaptive microwave oven, said communication activity being unrelated to purposeful control of said adaptive microwave oven.

33. An adaptive microwave oven controller comprising:

a processor; and a communication receiver to detect a presence of unrelated radio signal activity from a source other than a microwave generator of said microwave oven, said unrelated radio signal activity being unrelated to purposeful control of said adaptive microwave oven.

34. The adaptive microwave oven controller according to claim 33, further comprising:
   a pause control module in communication with said processor and said communication receiver, said pause control providing a pause signal to said processor based on receipt of a detected presence of said communication activity.

35. The adaptive microwave oven controller according to claim 33, further comprising:
   a microwave generator in communication with said processor.

36. An adaptive microwave oven controller, comprising:
   a processor; and
   a cordless telephone receiver to detect a presence of communication activity from a source other than a microwave generator of said microwave oven.

37. The adaptive microwave oven controller, comprising:
   a processor; and
   a communication receiver to detect a presence of communication activity from a source other than a microwave generator of said microwave oven;
   wherein said pause control module includes:
   a trickle control module capable of preventing degradation of an existing cooking cycle of an adaptive microwave oven.

38. The adaptive microwave oven controller, comprising:
   a processor; and
   a wireless network to detect a presence of communication activity from a source other than a microwave generator of said microwave oven.

39. A method of adaptively controlling a microwave oven to avoid interference with communication signals in a vicinity of said microwave oven, comprising:
   communicating information regarding a presence of unrelated radio signals in a vicinity of said microwave oven, to a microwave oven; and
   controlling an operation of said microwave oven based on a characteristic of said unrelated radio signals;
   wherein said unrelated radio signals is unrelated to purposeful control of said microwave oven.

40. The method of adaptively controlling a microwave oven to avoid interference with communication signals in a vicinity of said microwave oven according to claim 39, wherein:
   said characteristic is a frequency of said unrelated radio signal.

* * * * *

UNITED STATES PATENT AND TRADEMARK OFFICE
CERTIFICATE OF CORRECTION

PATENT NO.    : 6,346,692 B1
DATED         : February 12, 2002
INVENTOR(S)   : Richard Ubowski and John P. Veschi It is certified that error appears in the above-identified patent and that said Letters Patent is hereby corrected as shown below:

<u>Column 6,</u>
Line 28, change "8" to -- 9 --.
Line 32, change "8" to -- 9 --.

<u>Column 7,</u>
Line 22, after "claim," please insert -- 18 --.

Signed and Sealed this

Seventeenth Day of September, 2002

Attest:

JAMES E. ROGAN
Attesting Officer            Director of the United States Patent and Trademark Office